UNITED STATES PATENT OFFICE 1,961,177

COMPOSITION FRICTION ELEMENT

Ray E. Spokes, Ann Arbor, Mich., assignor to American Brakeblok Corporation, New York, N. Y., a corporation of New York No Drawing. Application June 13, 1932, Serial No. 617,052

4 Claims. (Cl. 134—26)

One of the objects of the invention is to provide a bonding material consisting of a complete and stable union of a vegetable drying oil and a phenol-aldehyde resin; and another object is to produce with the use of this bonding material a composition friction element which is strong and tough and has a high degree of flexibility to enable it to be readily conformed and applied to arcuate or other supports therefor in brakes, clutches and the like and which is still dense and hard and possesses desired friction qualities.

In the practice of my invention, I provide a bonding mixture of purely polymerized vegetable drying oil and containing substantially no oxidized oil, preferably linseed oil, and a solvent or thinner, with a phenol-aldehyde condensation product commonly known as a "phenol resin". By "purely polymerized oil" I mean an oil which has its molecules united by means of its free bonds or links without any substantial satisfaction of said bonds or links previously by the introduction of any added elements or substances such as oxygen or hydrogen. Polymerization herein referred to means a chemical union of molecules by means of their major valences and must not be mistaken for that oil which authors commonly refer to for convenience as "polymerized" when they wish to include any forms of aggregation of portions of the molecules.

I recognize the previous use of fatty drying oils, such as linseed or China-wood oil with phenol-aldehyde condensation products as a binder in brake linings and clutch materials, but the novelty of this invention lies in the use of a prepared bonding material consisting of the chemical union of purely polymerized vegetable drying oil containing substantially no oxidized oil and a phenol-aldehyde resin.

I have found that such chemical union of purely polymerized vegetable drying oil and the phenol-aldehyde resin occurs without oxidation of the oil, and a high flexible rubbery-like product results from the use of this prepared bonding material even after oven curing to remove the solvent, in contrast to the hard rigid product resulting from the chemical union of ordinary vegetable drying oils and a phenol-aldehyde resin in prolonged oven curing or exposure to heat necessary to effect a union. This purely polymerized oil is a well known commercial product and is prepared by carefully polymerizing a vegetable drying oil by heat under a vacuum and preferably in an atmosphere of carbon dioxide.

It is known to be difficult to effect the pure polymerization of an oil by heat alone and that it is a delicate process because the polymerizing temperature is dangerously near to that at which the molecular constitution of the oil is destroyed, as explained in Patent 1,395,744 Seigle, November 1, 1921. Furthermore, a vegetable drying oil mixed but not chemically united with a phenol-aldehyde resin would tend as much to oxidize during prolonged baking or curing temperature required for the finished product as to form a chemical union with the resin.

I avoid all these difficulties and the possibility of oxidation by employing a bonding material in which the purely polymerized oil is already chemically united with the phenol-aldehyde resin and which does not depend for chemical union of its constituents upon subsequent baking or curing temperatures.

I prefer to use a purely polymerized oil of so-called bubble viscosity between twenty and fifty minutes in order to effect maximum union between the polymerized oil and the resin. This thorough union of the polymerized oil containing substantially no oxidized oil and the resin prior to employment of same as a binder in friction elements is essential for the reason that no further chemical change takes place in situ, and a feature of this invention is the short period required in heating and fluxing the binding elements and removal of the solvent. The binder thus produced by the chemical union of a purely polymerized drying oil, that is, containing substantially no oxidized oil, and a phenol-aldehyde resin is extremely stable, has practically no tendency to oxidize, and will not undergo chemical alteration upon exposure to air, and when milled into semi-solution with a suitable solvent, as xylol, and compounded with asbestos, and pyrobituminous material, produces a friction element that is also extremely stable and is hard, yet flexible.

As an example I may use 4 1/10 pounds of purely polymerized linseed oil, that is containing substantially no oxidized oil, and 1 1/10 pounds of phenol resin milled and precooked at about 350° F. When this mixture cools it is a tough, rubber-like chemically combined union of the ingredients by union of any free bonds of the original polymerized oil remaining with the phenol resin. This bonding material, reduced with a proper solvent or thinner, may then be mixed with a base mixture of short fiber asbestos and pyrobituminous material. As an example I may use, by weight, 65 parts of asbestos, 25 parts of bituminous coal and 6 parts of a coal tar solvent, as xylol. This mixture is mixed in a dough mixer or other suitable apparatus and agitated until the bond mixture is thoroughly incorporated in the base mixture. The resulting composition is then molded in a continuous strip of desired dimensions and the strip is formed in a coil or cut into lengths and the coils or lengths are placed in a suitable oven and cured. I prefer to allow about thirty minutes for the temperature in the oven to reach 350° F. and then hold this temperature until the solvent is completely removed, which requires about thirty minutes. This operation is conducted without pressure and without vulcanization. In this way I produce in much less time than has been possible heretofore a product which is strong, tough and sufficiently flexible to enable it to be readily conformed to arcuate and other supports for braking elements in brakes, clutches and the like. The product is highly elastic in contrast to the rigid products made by adding phenol resin to any drying oil which has not been previously polymerized before cooking the phenol resin, and it is heat and wear resistance and will not glaze.

I have given an example of a mixture which may be satisfactorily used in the manner described for making brake linings about ⅜ inch thick for use on brakes for automotive vehicles and while the proportions specified may be maintained for brake elements of other thickness the oven temperatures and the period of time the mixture remains in the oven may be varied as required to completely remove any solvent employed. While I believe the invention will be used principally in the manufacture of friction elements in the form of strips, it can also be used in the manufacture of friction elements in the form of blocks or segments in a mold press for which purpose it will be desirable because of the strength, toughness, and flexibility which it imparts to the block.

I do not restrict the invention to the specific materials and formulæ herein specified but reserve the right to use any equivalents for the materials and to vary the proportions and the temperatures and times as may be found desirable to satisfy different conditions or for other purposes within the scope of the following claims.

I claim:

1. A bonding material consisting of the reaction product of a vegetable drying oil, purely polymerized and containing substantially no oxidized oil, and a phenol resin.

2. A bonding material consisting of a precooked union of a vegetable drying oil, purely polymerized and containing substantially no oxidized oil, and a phenol resin.

3. A bonding material consisting of a precooked union of a vegetable drying oil, purely polymerized and containing substantially no oxidized oil, and a phenol resin in the proportions of about 3½ times as much oil as phenol resin by weight.

4. The herein described method of making a bonding material which consists in mixing a vegetable drying oil, purely polymerized and containing substantially no oxidized oil, and a phenol resin in the proportions of about 3½ times as much vegetable drying oil as phenol resin, and cooking the mixture at about 350° F.

RAY E. SPOKES.